US006832294B2

(12) United States Patent
Wicki et al.

(10) Patent No.: US 6,832,294 B2
(45) Date of Patent: Dec. 14, 2004

(54) INTERLEAVED N-WAY SET-ASSOCIATIVE EXTERNAL CACHE

(75) Inventors: Thomas M. Wicki, Palo Alto, CA (US); Koen R. C. Bennebroek, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 269 days.

(21) Appl. No.: 10/127,172

(22) Filed: Apr. 22, 2002

(65) Prior Publication Data

US 2003/0200395 A1 Oct. 23, 2003

(51) Int. Cl.[7] .......... G06F 12/00

(52) U.S. Cl. .......... 711/128; 711/127; 711/133

(58) Field of Search .......... 711/118, 3, 127, 711/145, 128, 146, 133, 154, 157, 156, 167; 713/400, 500–502, 600; 714/6, 768, 762; 365/189.08, 198, 230.04, 233; 710/35

(56) References Cited

U.S. PATENT DOCUMENTS 5,893,146 A * 4/1999 Pickett .......... 711/128
6,226,707 B1 * 5/2001 Mattela et al. .......... 711/3

* cited by examiner

*Primary Examiner*—Pierre M. Vital
(74) *Attorney, Agent, or Firm*—Martine & Penilla, LLP

(57) ABSTRACT

An n-way interleaved set-associative external cache utilizes standard burst memory devices such as DDR (double data rate) memory devices. The interleaved set-associative cache organization scheme is designed to fully utilize burst efficiencies during snoop and invalidation operations. Cache lines are interleaved in such a way that a first burst transfer from the cache to the cache controller brings in a plurality of tags. The contents of the memory level device locations associated with each tag are stored in an alternating pattern in contiguous memory locations.

42 Claims, 7 Drawing Sheets

INTERLEAVED N-WAY SET-ASSOCIATIVE EXTERNAL CACHE

BACKGROUND OF THE INVENTION

1. Field of the Invention

This invention relates in general to memory architectures for computer systems and, more particularly, to high performance cache memories for use with computer processors.

2. Description of the Related Art

Computer processors have attained widespread use throughout many industries. A typical goal of many processors is to process information quickly. Processors often take many clock cycles to access data that is stored in a main memory located external to the processor. Not only do these external memory accesses require a significant amount of time, these accesses also consume a significant amount of power. Cache memories have often been used to enhance computer system performance by providing a relatively small, high speed memory (or cache) for storing instructions and data that have recently been accessed by the processor.

SUMMARY OF THE INVENTION

A method, cache system, and cache controller are presented. An n-way interleaved set-associative external cache utilizes standard burst memory devices such as DDR (double data rate) memory devices. The interleaved set-associative cache organization scheme is designed to fully utilize burst efficiencies during snoop and invalidation operations. Cache lines are interleaved in such a way that a first burst transfer from the cache to the cache controller brings in a plurality of tags. The contents of the memory level device locations associated with each tag are stored in an alternating pattern in contiguous memory locations.

A method for storing information in a cache comprises storing a first tag data in one of a plurality of n contiguous storage locations in a memory device, wherein the first tag data is associated with a first of n locations in a memory level device. The method further comprises storing a second tag data in another one of the plurality of n contiguous storage locations in the memory device, wherein the second tag data is associated with a second one of the n locations in the memory level device. The method further comprises storing the contents of the first memory level device location in a subset of a plurality of m contiguous storage locations in the memory device, wherein the plurality of m contiguous storage locations follow the n contiguous storage locations in a contiguous relationship within the memory device, wherein the contiguous subset comprises q of the m storage locations, where m/n=q. The method further comprises storing the contents of the second memory level device location in another subset of the plurality of m contiguous storage locations in the memory device, wherein the other contiguous subset comprises q of the m storage locations, wherein m/n=q. The contents of the first memory level device location and the contents of the second memory level device location are stored in an interleaved relationship with each other such that portions of the first contents and second contents occupy alternating ones of the plurality of m storage locations.

A cache system is also provided. The cache system includes a memory device and logic that performs the method discussed above. A cache controller is also provided. The cache controller comprises logic that performs the method discussed above.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
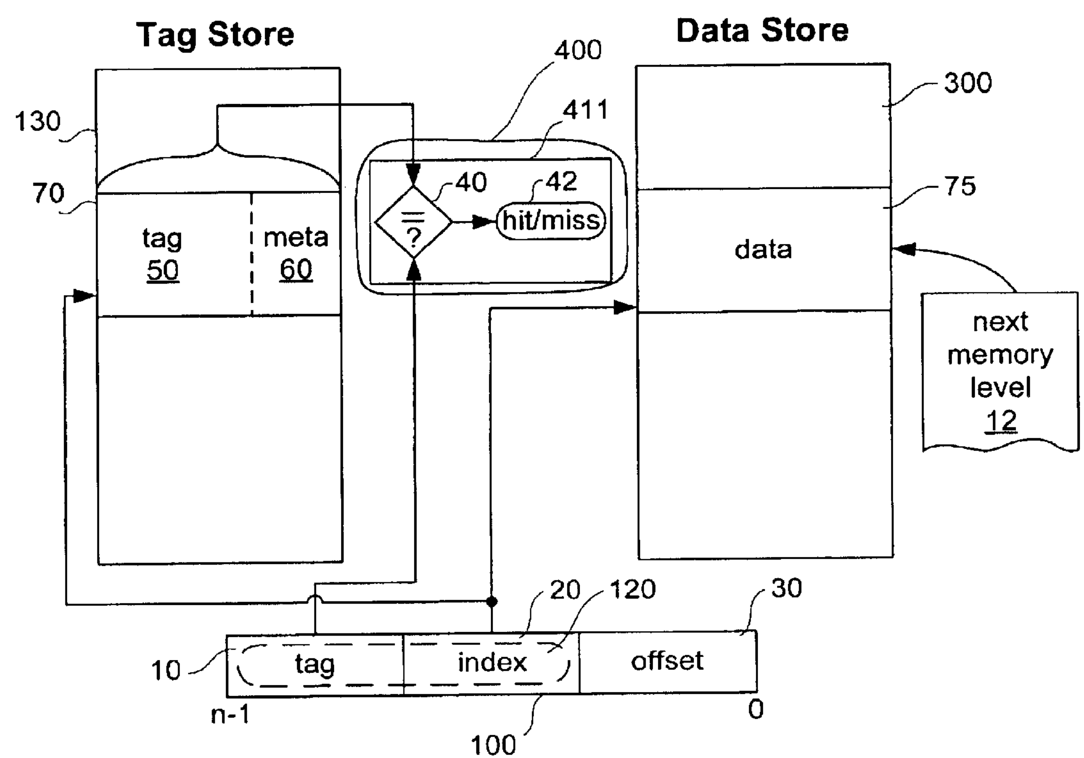
FIG. 1 is a layout diagram of a prior art direct-mapped cache.

The following sets forth a detailed description of a mode for carrying out the invention. The description is intended to be illustrative of the invention and should not be taken to be limiting.

Typically, a computer system contains one or more relatively small, fast memory caches that are built directly into the processor. This cache is sometimes referred to as an “internal” cache. Secondary to the internal cache are one or more larger and slightly slower caches sometimes referred to as “external” caches that resides outside the processor. These external caches are widely used in computer systems because they allow for caches with larger capacity. When the term “cache” is used without qualifiers, it normally refers to an external cache that is placed between the processor and system memory. Such cache is also sometimes referred to as a “system cache.” As used herein, unless otherwise noted, the term “cache” is used to refer to an external cache.

A factor in the performance of the processor is the probability that a processor-requested data item is already in the cache. When a processor attempts to access an item of information, it is either present in the cache or not. If present, a cache “hit” occurs. If the item is not in the cache when requested by the processor, a cache “miss” occurs.

Instructions and data are stored in an external cache, closer to the processor than the main memory, in the hope that, since they have been accessed once, they will be accessed again relatively soon. The speed or access time of the cache memory is substantially faster than that of the external main memory. By retrieving an instruction or data from the cache when a cache hit occurs rather than accessing the slower external main memory, significant time can be saved in the retrieval of the desired information translating into higher performance.

After a cache miss occurs, the information requested by the processor must then be retrieved from the next level of the memory hierarchy. This next level may be another cache or may be main memory, depending on the cache architecture for the particular system. The information is brought into the cache so that it may be accessed by the processor. A search for an item of information that is not stored in the cache after a cache miss usually results in an expensive and time-consuming effort to retrieve the item of information from the main memory of the system. To maximize the number of cache hits, data that is likely to be referenced in the near future operation of the processor is stored in the cache.

Three types of caches, "direct mapped," "fully associative," and "set-associative," are known to increase memory performance. For each type of cache, the cache is subdivided into sets. Each set in most modem processors contain a number of lines. When each set contains only one line, then each main memory address line can only be stored in one specific line slot in the cache. This is called direct mapping. In direct mapped caches, a particular block or line of information can only be stored in a single location in the cache according to the cache line address of the block or line.

In a "fully associative" cache, the line can be placed anywhere within the cache. In contrast, in a "set-associative" cache the line is restricted to be stored in a certain set of storage locations. Because each set contains several lines, a main memory line mapped to a given set may be stored in any of the lines, or "ways," in the set. In a 2-way set-associative cache, for instance, each set in the cache can store two lines of information. In a 4-way set-associative cache, each set in the cache can store four lines of information. Cache performance generally increases with increased associativity.

The tag and data store portions of a cache can be logically stored together in one or more memory devices. Alternatively, the tag and data store portions can be stored separately in one or more separate memory devices. In either case, they are typically stored in random access memory (RAM). One type of RAM memory device is a Double Data Rate (DDR) static random access (SRAM) memory device. A DDR device transfers data on both the rising edge and falling edge of a clock cycle. In contrast, single data rate memory transfers data only once per clock cycle—during either the rising edge or the falling edge. Theoretically, the DDR memory device can provide twice as much throughput, as a single data rate memory device, without requiring increasing latencies or requiring higher memory clock speeds. Described herein are certain cache design features that capitalize on the throughput afforded by DDR memory devices.

FIG. 1 illustrates an address tag 10 (sometimes referred to herein as "tag"), which is a set of bits that is used, together with bits in the meta data field 60, by a cache controller 411 to determine whether the contents of a requested line of memory is already in the cache. A tag is derived from the address 100 of the requested memory block, or "line." Depending on the addressing scheme of the particular system, the address 100 may be a physical address or a virtual address. The address tag 10 is a set of bits in a portion of the address, called the cache line address 120. The cache line address 120 identifies a line of memory. A second group of bits 20 of the cache line address 120 are used as an index as described below. FIG. 1 illustrates that, in addition to the cache line address 120, a memory address also includes block offset bits 30. The block offset bits 30 are a third set of bits of the address 100. The block offset bits 30 identify a particular byte within the memory line identified by the cache line address 120 in which the CPU 400 is interested.

FIG. 1 illustrates that the address 100 of a memory line is logically partitioned to provide an index 20. The index bits 20 are used as an index into the tag store 130. The tag store 130 is an area of a cache that identifies which data from main memory is currently stored in each cache line of a data store 300. Each cache line in the data store 300 is shared by a large number of memory addresses that map to it. The tag store 130 is used to keep track of which of these memory addresses is using each cache line at a given time.

As is explained in further detail below, the tag of every cache block, or line, that might contain the desired information is checked to see if it matches the cache line address 120 from the CPU 400. Each entry 70 in the tag store 130 is designed to contain a copy 50 of the tag bits 10 for each memory line whose data is stored in a corresponding entry 75 of the data store 300. In addition, the tag store entry 70 also contains one or more bits in the meta data field 60 associated with the cached memory line. The bit(s) in the meta data field 60 contain additional information about the cache line. The additional information is often used to manage a cache coherency protocol. For instance, it is necessary to know that a cache line does not have valid information. The most common procedure is to add a valid bit to the tag store entry 70 to indicate whether or not the entry contains a valid address. The bits in the meta data field 60 therefore indicate valid/invalid state for the cache line as well as other conditions such as ownership (i.e., read only/writable).

Reference to FIG. 1 is made to discuss operation of a prior art direct-mapping cache scheme. In a typical computing system, a central processing unit (CPU) 400 generates a memory address 100 when requesting information from the next-higher memory level 12. The next-higher memory level 12 may be, by way of two examples, a conventional main memory or a cache. A cache controller 411 uses the index bits 20 as an index into the tag store 130. The tag 50 in the tag store 130 as indexed by the index bits 20 is compared with the tag bits 10 in the address 100 provided by the CPU 400. Comparator hardware 40 associated with the cache controller 411 performs comparison logic to generate a hit or miss signal 42. The comparison logic evaluates the bits in the meta data field 60 to determine if the tag 50 in the tag store 130 contains valid data. The comparison logic also determines whether two tag values 50, 10 match. If the tag 50 data is valid and a match is detected, this means that data associated with the requested line is already in the data store 300. If not, a cache "miss" has occurred and the requested memory line therefore must be read from the next memory hierarchy level. The cache controller 411 is any conventional cache controller circuitry having the comparator hardware discussed herein and being capable of performing the functionality described herein.

If the memory line is already present in the cache, then the comparator hardware 40 generates a "cache hit" signal that indicates that the requested information is already in the cache. Upon a cache hit, the cache controller 411 uses the index bits 20 as an index into the data store 300 to retrieve the cached data associated with the desired memory address and forwards the data to the CPU 400.

When a cache miss occurs, the line of memory containing the missing item is retrieved from memory and forwarded to the CPU. In addition, the line of memory may be loaded into the cache, replacing another cache line. This process is called cache line replacement. In a direct mapping system, each line from main memory is restricted to be placed in a single line slot in the cache. This direct mapping approach simplifies the cache line replacement process, but tends to limit the hit ratio due to the lack of flexibility with line mapping. In contrast, flexibility of line mapping, and therefore a higher hit ratio, can be achieved by increasing the level of associativity. Increased associativity means that the number of lines per set is increased so that each line in main memory can be placed in any of the line slots ("ways") within the set.

When cache line replacement of a memory line occurs, the tag associated with the new line overwrites the previous tag in the tag store 130 and bits in the meta data field 60 are updated.

Figure 2:
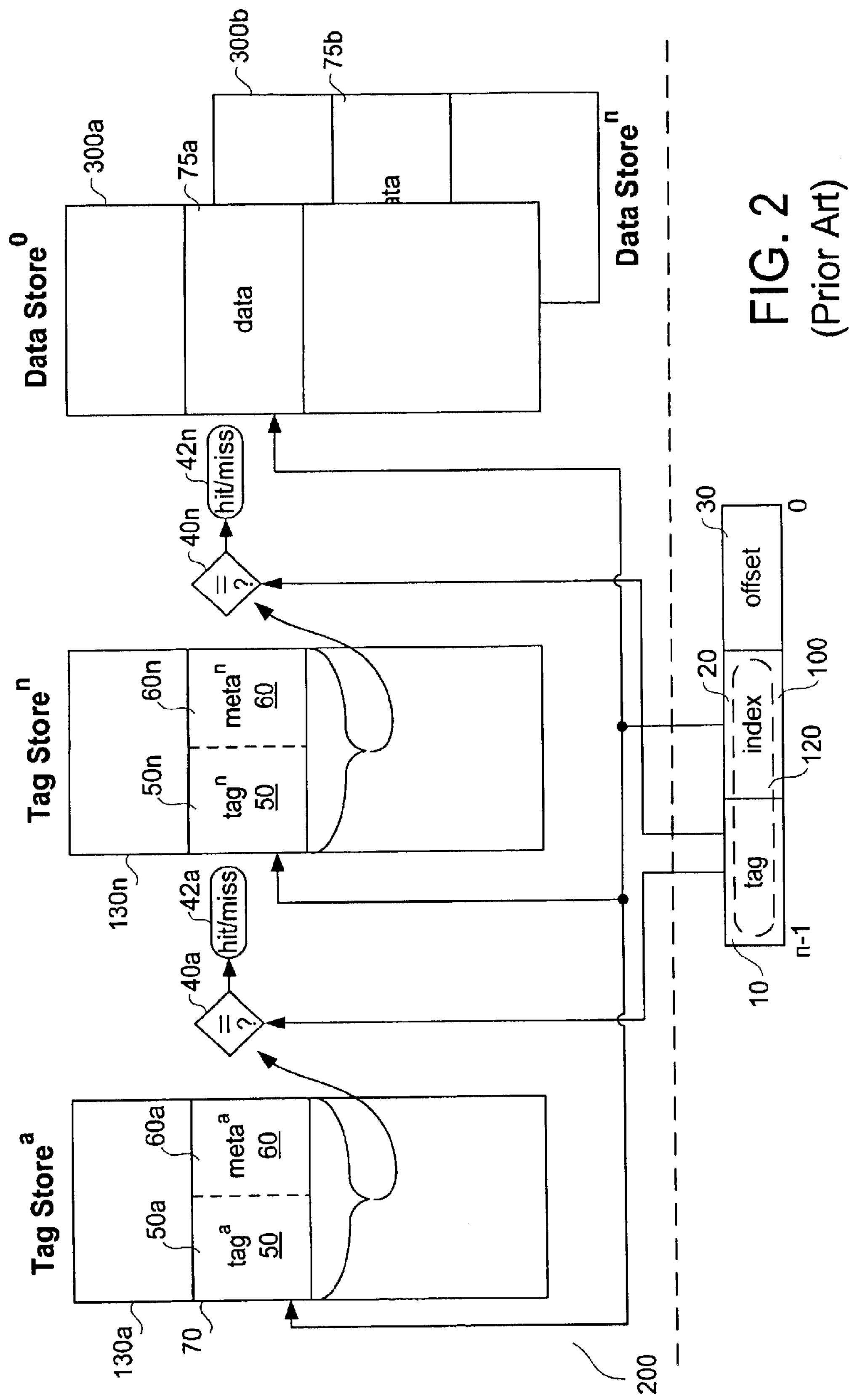
FIG. 2 is a layout diagram of a prior art set-associative cache.

FIG. 2 illustrates a typical prior art set-associative cache mapping scheme. Illustrated is an n-way set-associative cache 200, where n=2. In the set-associative cache 200, a memory line may be stored in any of n locations 75$a$, 75$n$ in the data stores 300$a$, 300$n$. As FIG. 2 illustrates, the n different locations 75$a$, 75$n$ are all associated with the same index number, with each location being included in a different one of n data stores 300$a$, 300$n$. In FIG. 2, the contents of a main memory line may be stored in either location 75$a$ or location 75$n$, the two locations forming a set. The same index value points to the same relative location in each tag store 130$a$, 130$n$, respectively, and to the same relative location in each data store 300$a$, 300$n$, respectively. In such a scheme, the tags 50$a$, 50$n$ in each tag store 130$a$, 130$n$, respectively, must be checked via comparators 40$a$, 40$n$, respectively, to determine whether a cache hit exists for the requested memory location.

The size of the entries in the data stores 300$a$, 300$n$ is relevant to cache design considerations. In at least one embodiment of a cache design, each entry in the data store 300 is 144 bits wide. At the same time, in at least one embodiment, a line of memory retrieved from the next memory hierarchy level into the data store 300 is 64 bytes, or 512 bits. Dividing a data store line having a width of 144 bits into a memory line requiring 512 bits indicates that four rows in the data store 300 are necessary for storage of one cached memory line. However, four rows in the data store 300 provide 576 bits of storage space, only 512 bits of which are needed to store the cached memory line. One skilled in the art will recognize that the specific bit sizes used herein are merely exemplary. Any size data store and memory hierarchy device may be used to exercise the present invention. The concept discussed in the following paragraph applies to any scheme wherein the size of the memory line modulo the size of the data store line is not equal to 0.

Figure 3:
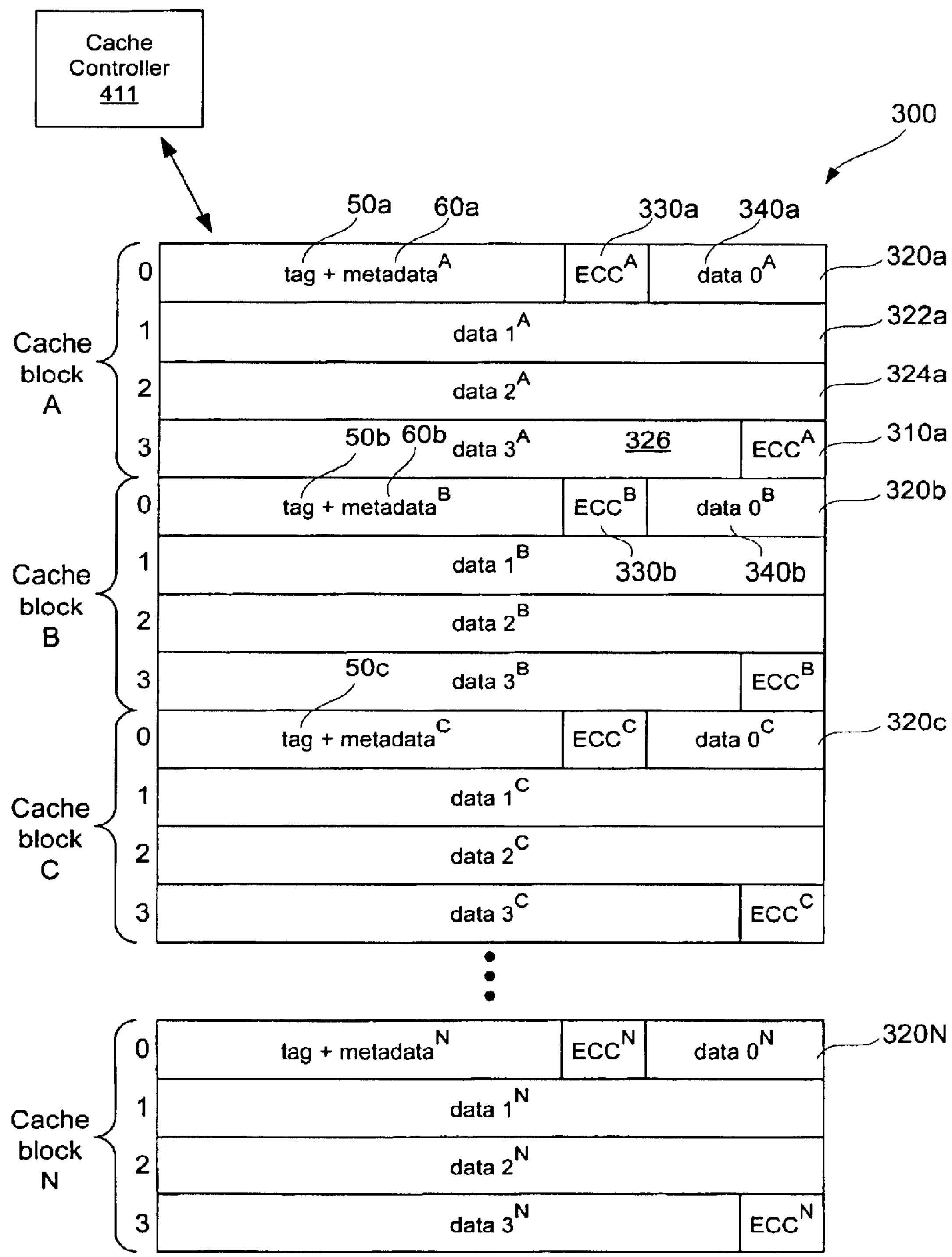
FIG. 3 is a layout diagram of a prior art cache wherein tags and data are stored in the same device.

FIG. 3 illustrates a direct-mapped cache design that provides using the extra bits of storage space in the data store to store the tag 50 and bits in the meta data field 60 along with the contents of the cached memory line, all in the same device 300, referred to herein as "the cache." FIG. 3 illustrates that the cached memory line comprises several lines, or partial lines, of memory data 320, 322, 324, 326. Following the last partial line of cached data 326, is an error correction code ("ECC") field 310. FIG. 3 illustrates that a second ECC field 330 is also stored in the cache block. The second ECC field 330 is an error correction code for the series of bits that make up the tag 50 and meta data field 60. This second ECC field 330 is an optional efficiency enhancement that is not necessary for implementation of an interleaved cache scheme as described herein. As used herein, the term "cache block" refers to the tag 50 and meta data field 60 as well as the memory data 320, 322, 324, 326, and the two ECC fields 330, 310.

The error correction codes (i.e., the contents of the ECC fields 310, 330) are helpful in addressing the problem that memory devices have the potential to return information that differs from the information originally stored at that location. The ECC codes 310, 330 provide support for error detection and correction. One skilled in the art will recognize that the ECC fields 310, 330 are data integrity enhancements that are not necessary to the primary functions of the cache scheme described herein. In at least one alternative embodiment, error detection can be accomplished through alternative means, such as parity checks. In at least one other embodiment, neither error detection nor correction is provided for by the bits stored in the data store 300. One skilled in the art will recognize that the bits of the error correction codes is not limited to the placement of the ECC fields 330, 310 illustrated in FIG. 3. Such bits may be placed at any convenient location within the cache block.

FIGS. 1 and 3 are relevant to a discussion of the bits in the meta data field 60. As is stated above, the meta data field 60 contains one or more bits that indicate whether the cache line stored at that location of the cache 300 contains valid data. If the cache controller 411 detects that the cache line is invalid then the cache controller 411 indicates to the rest of the processor 400 that there has been a cache miss.

One scenario in which the cache line might be rendered invalid occurs in a system that contains a plurality of processors. In such a system, each of the multiple processors may access the same system memory, but each may have its own cache. A cache coherency protocol is needed to ensure that, if one processor updates its cache, the other processors are made aware that they could have stale data in their caches. That is, it is necessary to keep all the processors in a multi-processor system in a state of coherency by ensuring that any shared operand that is changed in any cache is changed throughout the entire system. To this end, a "snoop" system is often utilized. In a snooping cache coherent system, all caches on the bus monitor (or "snoop") the bus to determine if they have a copy, in their cache, of the block of data that the other CPU 400 has requested on the bus. Every cache has a copy of the sharing status, stored in the meta data field 60, of every block of memory that it has stored. Each of the processors snoops the bus to determine when another of the processors (i.e., a "requesting" processor) requests to change a line of memory. If the requested line is stored in the cache of any of the non-requesting processors, the non-requesting processors update the meta data field 60 for that memory line in its cache, indicating that the stored cache line is invalid. If the non-requesting processor 400 holds the latest-updated version of the requested cache line, the non-requesting processor 400 passes the updated cache line on to the requesting processor.

If a CPU 400 requests a read-only copy of a memory line, then the cache controller 411 ensures, indicated by the bits in the meta data field 60, that the CPU 400 cannot write to the cache line.

For example, one cache coherence protocol is the MOESI ("modified, owned, exclusive, shared, invalid") protocol. If a CPU 400 asks for a read-only copy of a memory line, the meta data field 60 will reflect a "shared" state, indicating to the CPU 400 that the CPU 400 may not modify the data. In contrast, if a CPU 400 detects through snooping that another requesting CPU 400 has requested to change data in that memory line, then the snooping CPU 400 will change to "I" (i.e., invalid) state within the meta data field 60. Because there are 5 states associated with the MOESI cache coherence protocol, a meta data field 60 that supports the MOESI protocol requires at least 3 bits. The present invention is not necessarily limited to the MOESI cache coherence scheme. Any cache coherence scheme can be used, as long as the scheme allows for a meta data field 60 that can be stored in the first cache line associated with a memory line. Other cache coherence protocols include, for instance, directory based schemes.

A discussion of FIG. 3 reveals that the direct-mapped scheme illustrated therein does not fully utilize the efficiencies inherent in the DDR memory burst design. The discussion in this paragraph assumes the cache 300 is implemented as a DDR devices or any other devices that provide bursts of two cache lines. However, one skilled in the art will recognize that the cache organization scheme discussed herein is contemplated to encompass burst-type memory devices with any known burst length.

Regarding a device with burst length of two, when the cache controller 411 requests data from the cache 300, it issues a send command to the cache 300. The send command, in at least one embodiment, must be issued on the rising edge of a clock cycle, since at least one embodiment of the DDR memory device that stores the cache 300 can only process commands on the rising edge of a clock cycle. Issuance of the send command 420 causes the cache 300 to send row 0 of a cache line on the rising edge of the next clock cycle and the next row, row 1, on the falling edge of the cycle, thereby effecting a row burst. When performing a snoop, this is all that is required, since the tag and meta data are contained within row 0. On a cache hit, where it is necessary to transmit all four rows of the cache line to the cache controller 411, the cache controller 411, based on the type of DDR device, may issue a continue command that causes rows 2 and 3 of the cache line to be transmitted from the cache 300 to the cache controller 411 during the rising and falling edges, respectively, of the third clock cycle.

Because the cache controller 411 only needs row 0 of a cache line on a snoop operation, and because a single send command will cause two rows of a DDR cache line to be forwarded to the cache controller 411 (one row on each of the rising and falling edge of the clock cycle) for a device with a burst-length of two, the cache scheme illustrated in FIG. 3 does not fully utilize the burst features of a DDR cache for a snoop. That is, one row sent in response to a send command issued for a snoop operation is superfluous.

Figure 4:
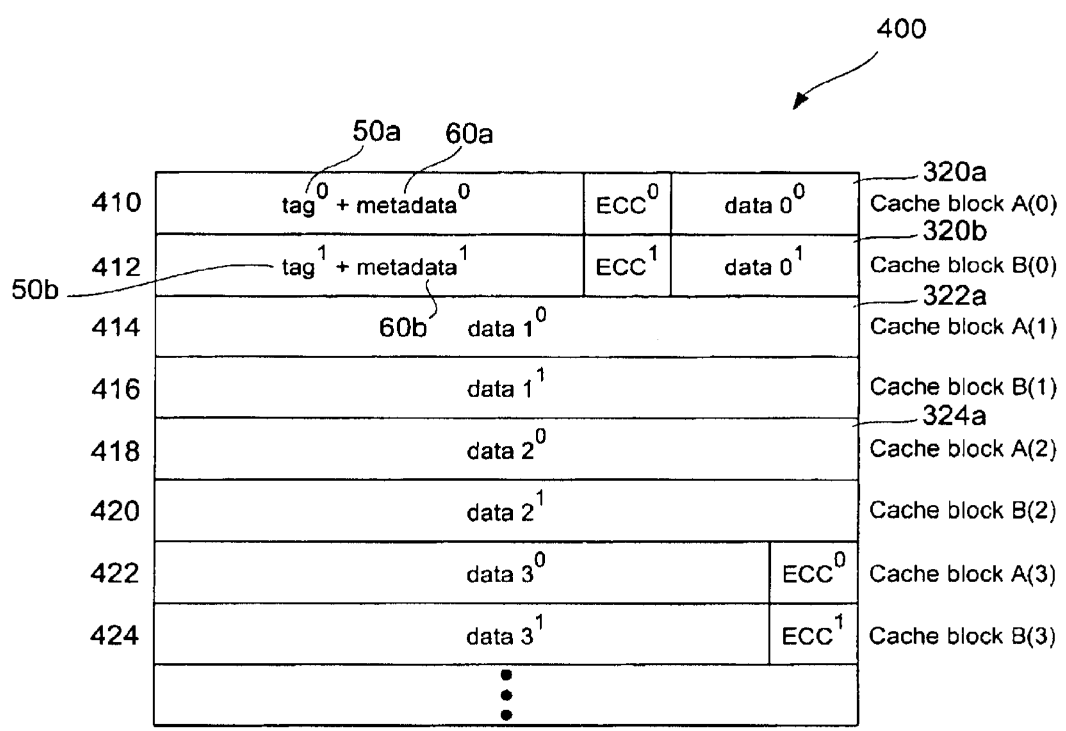
FIG. 4 is a layout diagram of a two-way interleaved set-associative cache.
Figure 5:
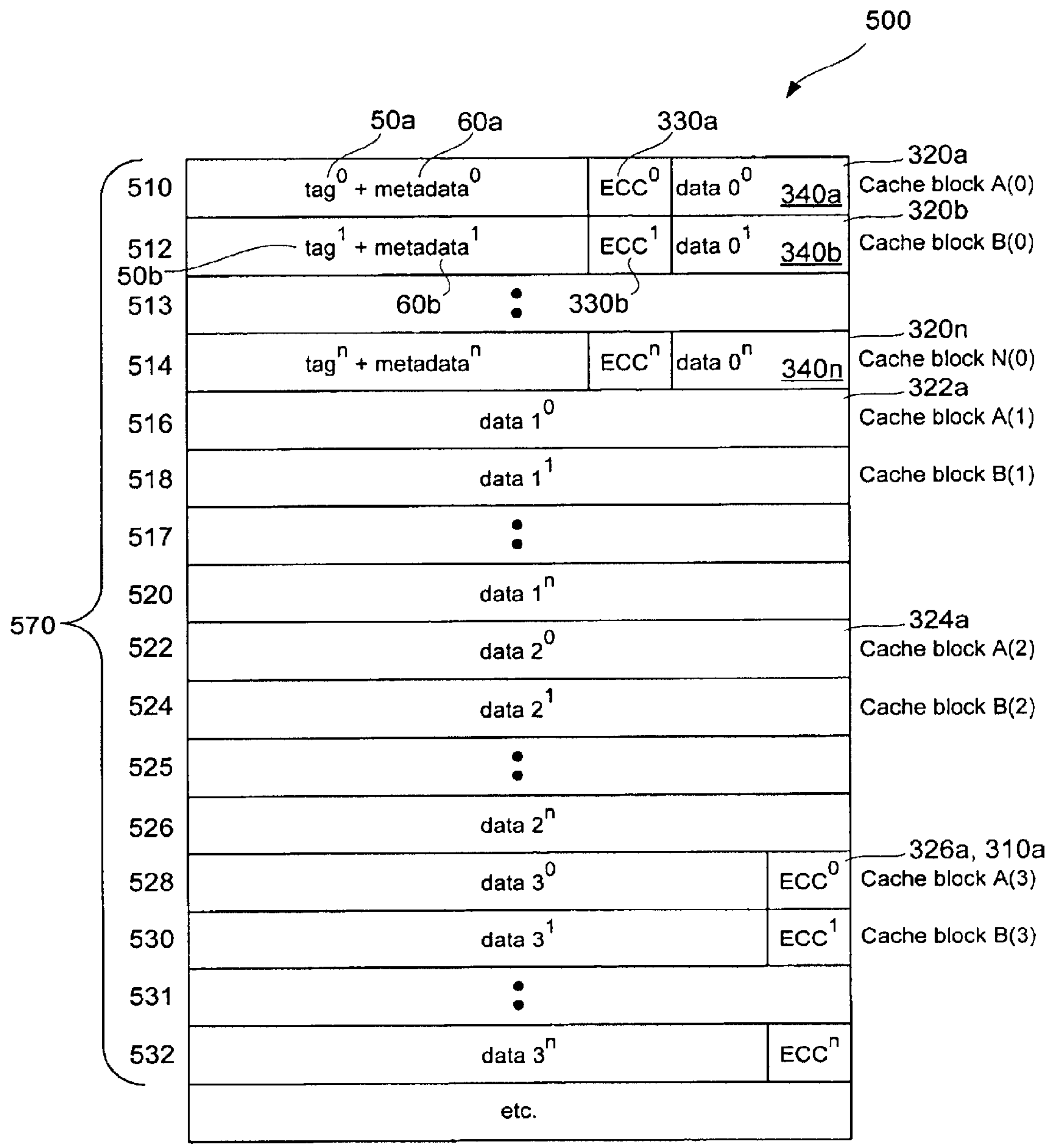
FIG. 5 is a layout diagram of a first embodiment of an n-way interleaved set-associative cache.

FIGS. 4 and 5 illustrate a first embodiment of a set-associative cache organization scheme that is designed to fully utilize burst efficiencies during snoop and invalidation operations. FIG. 4 illustrates a two-way interleaved set-associative cache while FIG. 5 illustrates an n-way interleaved set-associative cache. This scheme increases efficiency during a snoop operation, thereby effectively increasing snoop bandwidth, which is a critical performance issue for multi-processor systems. In the scheme illustrated in FIG. 4, two cache lines are interleaved in such a way that the first burst transfer from the cache 400 to the cache controller 411 (FIG. 1) brings in two tags. That is, the first and second tags 50*a*, 50*b*, respectively, are stored in contiguous storage locations 410, 412, respectively, within the DDR cache 400. This provides the same snoop bandwidth as a standard direct-mapped cache but enables a two-way set-associative cache, which provides better performance than a direct-mapped cache. Similarly, for an invalidation operation, the cache line of interest is invalidated by modifying one or more bits in its meta data field 60*a* or 60*b*, and one or both tag rows 410, 412 are written back to the external cache 400, without requiring more bandwidth than a direct-mapped cache.

The cache illustrated in FIG. 5 is a generalization from the 2-way cache 400 of FIG. 4 to any n-way cache 500. For an n-way cache, storage for n tag rows 320*a* through 320*n* is allocated in contiguous memory locations 510 through 514 in the DDR cache 500. As used herein, a "tag row" 320 includes tag 50 and meta data field 60. In at least one embodiment, the tag row 320 also includes an ECC field 330 calculated for the tag 50 and meta data 60 fields. In addition, at least one embodiment of the tag row 320 also includes an initial portion of memory data 340 from the associated line in main memory 12. Contiguously following the n memory locations 510 through 514 that store the tag rows 320*a* through 320*n*, storage is allocated for m contiguous memory locations 516 through 532 in the cache 500 to store memory data from the n memory locations with which the tag rows 320*a* through 320*n* are associated. Because a memory line typically comprises more bits than a cache row, data from each memory line from the next memory level 12 comprises more than one of the m memory locations 516 through 532 in the DDR cache 500. That is, the memory data from each memory line from the next memory level 12 that is stored in the DDR cache 500 requires, in addition to the initial portion of memory data 340 stored in the tag row 320, a subset (q) of the m storage locations 516 through 532, where m divided by n=q. For example, in a 4-way set-associative cache, n=4. In a cache that provides 144 bit storage locations, q=3 where the memory data comprises 512 bits. Accordingly, in order to implement a 4-way set-associative cache, each stored memory line will require allocation of 3 of the m storage locations (referred to herein as a "data rows"), in addition to the tag row 320, to store its data. Three (3) data rows (i.e., q) multiplied by the four (4) ways (i.e., n) equals 12 (i.e., m) storage locations 516 through 532 that must be allocated in the DDR cache 500 to store the memory data in a 4-way set-associative cache.

FIG. 5 shows a single cache organization block 570 comprising data and tags for n cache blocks. An N-way set-associative cache may be implemented by organizing x cache organization blocks 570 into an N-way cache such that N=xn.

One skilled in the art will recognize that the scheme discussed above is based on the assumption that the tag 50, metadata 60, and ECC 330 of a tag row will occupy one or less full row in the cache. However, the cache organization scheme discussed above also provides advantages when all or a subset of the following occupy more bits than are provided for in a single row of the cache: tag 50, metadata 60, and/or ECC 330 (collectively referred to herein as "tag-related components"). For any memory device having a burst length of n, and wherein the tag-related components for a memory line occupy all or a portion of x cache rows, increased set associativity can be achieved without increasing snoop bandwidth by providing a y-way associative cache where y=n/x, rounded down to the closest integer. For instance, if the tag-related components require all or a portion of two cache rows, and the device provides a burst length of four, then a 4/2-way cache (i.e., 2-way cache) is supported according to the present invention.

FIG. 4 illustrates that, in the interleaved cache 400 illustrated in FIG. 4, snoop operations for a two-way set-associative cache 400 provide increased cache performance without increasing the snoop bandwidth requirements. In response to the first send command from the cache controller 411, cache rows 410, 412 containing both tags for the 2 ways in the set are provided to the cache controller 411. On a read operation, eight cache rows are retrieved in order to obtain the four cache rows of interest in a hit case. For example, in order to provide cache block A as illustrated in FIG. 4 to the CPU 400, rows 410, 416, 422, and 428 are retrieved from the DDR cache 400 by the cache controller 411 via four separate commands. When a DDR device provides data in bursts of two rows (as discussed herein), each fetch in a cache line access will retrieve one row of interest (i.e., 414) and one row that is not of interest (i.e., 416). The cache controller 411 does not receive a full cache block (i.e., tag row plus data0 through data3) until the results of each of the four separate fetch commands have been returned to the cache controller 411.

FIG. 5 illustrates that storage for each of the subsets of q storage locations is allocated in an "interleaved pattern" within the m storage locations 516 though 532. For illustrative purposes, the n-way cache 500 illustrated in FIG. 5 will be discussed as a 4-way cache, but one skilled in the art will recognize that the scheme applies to any value for n, including the two-way cache 400 illustrated in FIG. 4. The "interleaved pattern" is such that the first n contiguous storage locations 516 through 520 within the m storage locations are allocated to store the first data row for each of the n main memory lines. Contiguously following, the next n contiguous storage locations 522 though 526 are allocated to store the second data row for each of the n main memory lines. Similarly, the next n contiguous storage locations 528 through 532 are allocated to store the third (where q=3) data row for each of the n memory lines. In this manner, for the m data row storage locations 516 through 532, locations 0, 0+n, and 0+2n are allocated for the 3 (q) data rows associated with the memory line corresponding to tag line 0 320*a*. Similarly, locations 1, 1+n and 1+2n are allocated for storage of the 3 (q) data rows associated with tag line 1 320*b*. Similarly, locations n−1, (n−1)+n and (n−1)+2n are allocated within the m storage locations 516 through 532 to store the 3 (q) data rows associated with the memory line corresponding to tag line n 320*n*.

If a DDR device provides data in bursts of four rows rather than two, then the n-way generalized scheme illustrated in FIG. 5 is an efficient implementation of a 4-way set-associative cache that can capitalize on the burst nature of DDR devices, and so on (burst length n allows for optimization up to n-way).

When the scheme illustrated in FIGS. 4 and 5 is used in a device that provides data in bursts, certain advantages are realized. One such advantage is that cache controller 411 logic is relatively simple and straightforward. For every cache access, exactly one of the received rows is of interest and the others are not. For instance, for each two-row burst access, the same row of the two is of interest, and the other is always superfluous. For example, referring to FIG. 4, if cache block A is the block of interest, then the second row received in each burst is superfluous. On the first burst, the first tag row 410 is of interest and the other 412 is superfluous. On subsequent bursts, the first rows are always of interest because they are associated with cache block A—rows 414, 418 and 422 are of interest while rows 416, 420 and 424 are superfluous. Conversely, if cache block B is of interest, then the first row received in each burst is superfluous. On the first burst, tag row 412 is of interest and the other 410 is superfluous. On subsequent bursts, the second rows are always of interest because they are associated with cache block B—rows 416, 420 and 424 are of interest while rows 414, 418 and 422 are superfluous.

Similarly, for each four-row burst access, the same row of the four is of interest, and the other three are always superfluous. For example, referring to FIG. 5 (assuming n=4), if cache block A is the block of interest, then the second, third, and fourth rows received in each burst are superfluous. On the first burst, the first tag row 510 is of interest and the other tag rows 512 through 514 are superfluous. On subsequent bursts, the first rows are always of interest because they are associated with cache block A—rows 516, 522 and 528 are of interest while rows 518–520, 524—524 and 530–532 are superfluous. Conversely, if cache block N is of interest, then the first three rows received in each burst is superfluous. On the first burst, tag row 514 is of interest and the others 510, 512, etc. are superfluous. On subsequent bursts, the nth rows are always of interest because they are associated with cache block N. Assuming that n=4, rows 520, 526 and 532 are of interest while the other rows, including 516, 518, 522, 524, 528, and 530 (plus additional rows not explicitly shown but indicated with ellipses). With this regular and predictable behavior, logic of the cache controller 411 (FIG. 1) is straightforward.

For similar reasons, writeback logic for the n-way interleaved cache schemes illustrated in FIGS. 4 and 5 is relatively simple as well. One skilled in the art will recognize that burst devices not only read data in bursts, as described above, but also write data in bursts. Therefore, it is necessary for the cache controller 411 to keep track of the data it received in the superfluous rows, so that, upon a writeback operation from the cache to the next memory level, the superfluous rows remain unchanged. As such, any modified data in the rows of interest must be merged with the old data from the superfluous rows before a writeback. In a very regular scheme where the same relative row of each burst is of interest or not, the logic in the cache controller for managing this read, modify, merge, writeback function is relatively simple and straightforward.

The inventors have determined that an additional efficiency related to the writeback function can be realized with a modified burst-type memory device. Such a memory device provides bursts of rows within the device based on a base address, as is known in the art. However, the modified device increments the base address by n, rather than 1, for rows subsequent to the first row (i.e., row at base address) that are provided in the burst.

Referring to FIG. 5 by way of example, in an n-way cache where n=4, the modified device provides a writeback in a burst of four rows. For this discussion, it is assumed that (starting from the top and working downwardly) the first, second, third, and fourth sets of ellipses in FIG. 5 correspond to a third of four cache blocks and thus correspond to missing reference numerals 513, 519, 525, and 531, respectively. For a writeback of cache block A, the modified device would provide a burst of the following rows in the cache 500: tag row 510 (the base address), data row 516 (base address plus n (four) rows), data row 522 (base address plus 2n (eight) rows), and 528 (base address plus 3n (twelve) rows).

Figure 6:
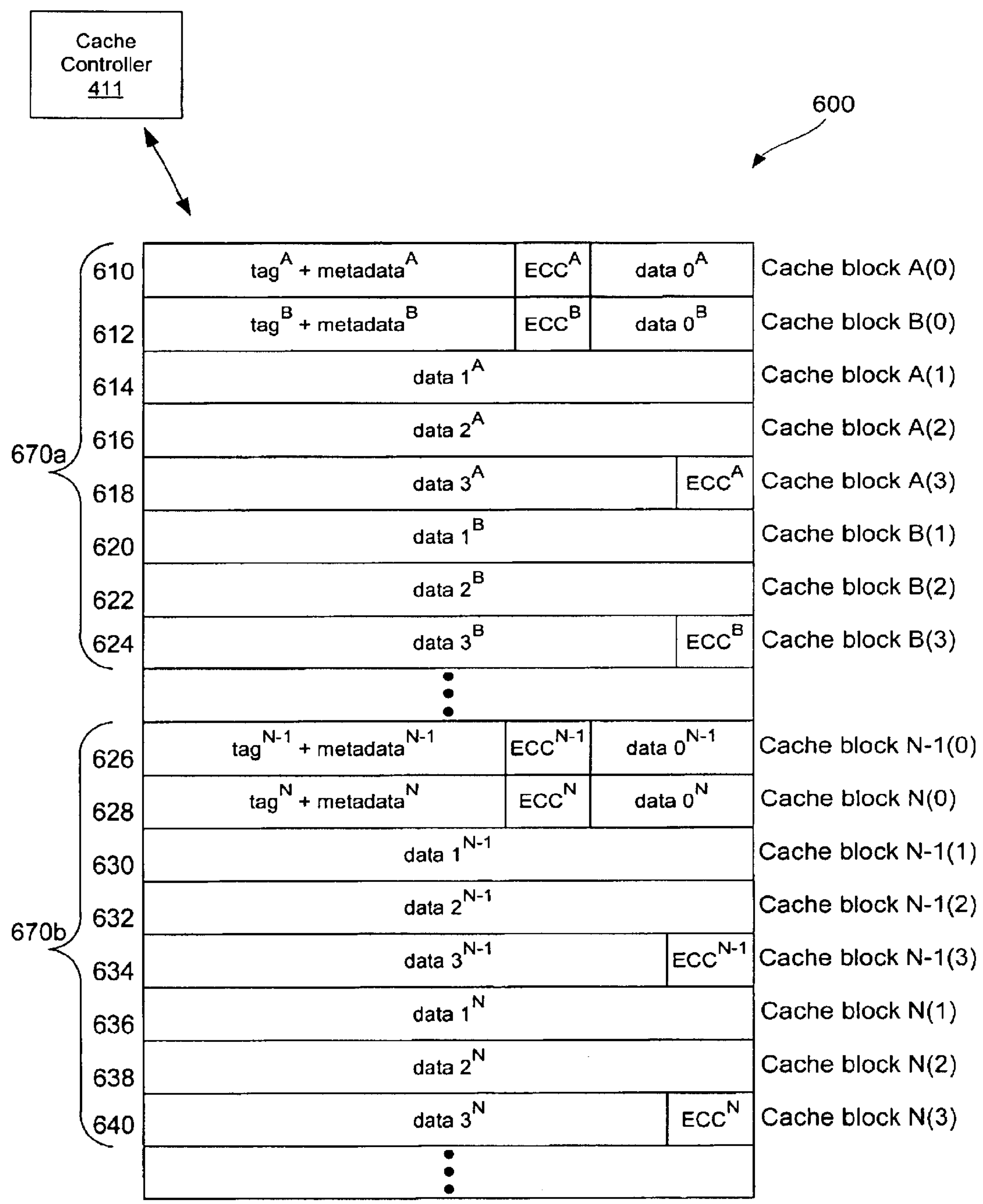
FIG. 6 is a layout diagram of a second embodiment of an N-way interleaved set-associative cache for a memory device with burst length of 2.
Figure 7:
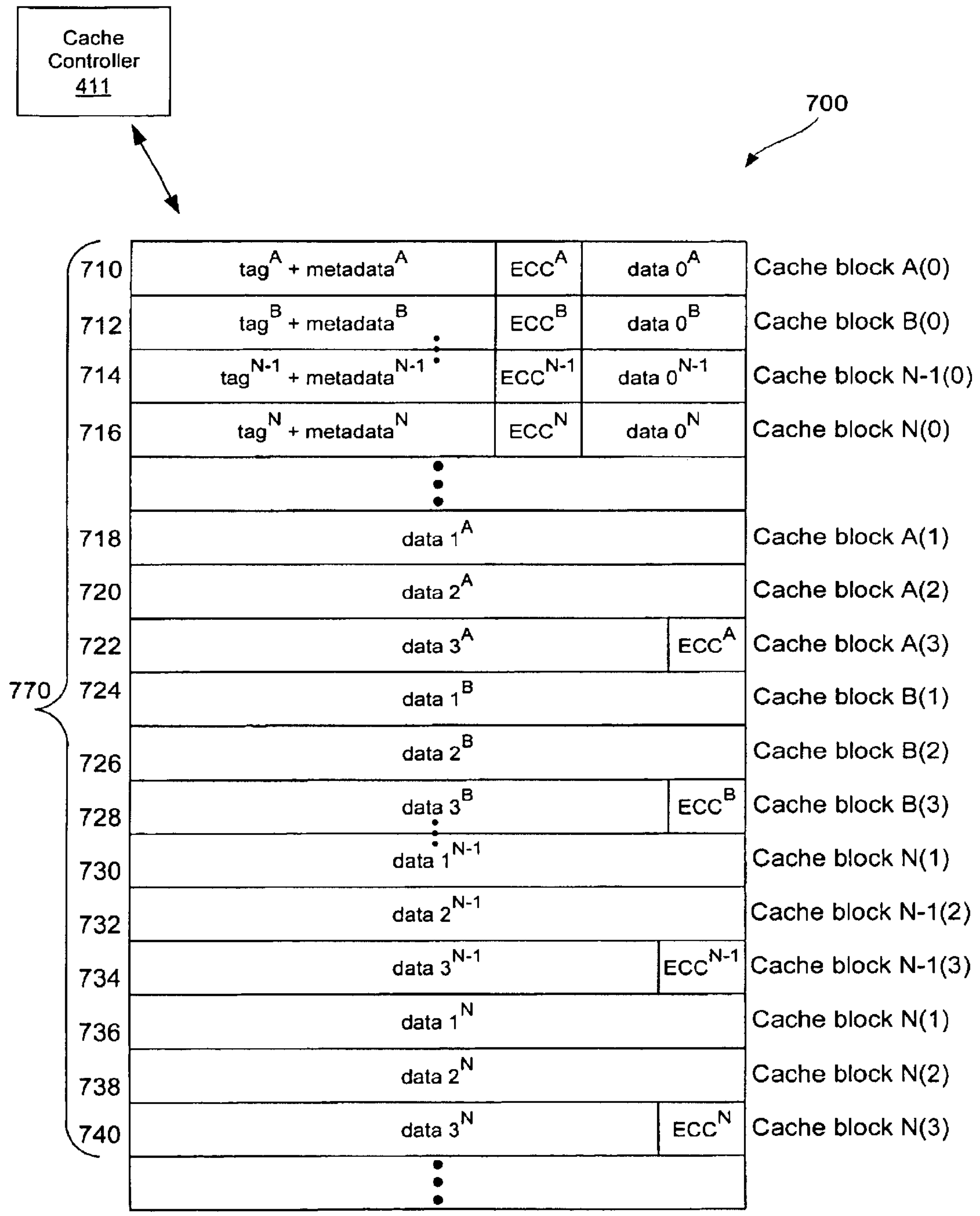
FIG. 7 is a layout diagram of a second embodiment of a generalized N-way interleaved set-associative cache for a memory device with burst length of n.

FIG. 6 and FIG. 7 illustrate a second embodiment of a set-associative cache organization scheme. FIG. 6 illustrates a two-way interleaved set-associative cache organization block 670*a*, 670*b* that can be used alone, or in plurality, to implement a 2x-way cache with a burst device having a burst length of two. If one (i.e., x=1) cache organization block 670 is used, the result is a two-way set-associative cache. If two (i.e., x=2) cache organization blocks 670*a*, 670*b* are used, then the result is a four-way set-associative cache. Stated more generally, if n is the burst length and x is the number of each organization blocks 670 utilized, then FIG. 6 shows an interleaved organization scheme for an nx-way cache. For purposes of illustration, n=2 in FIG. 6. Accordingly, FIG. 6 illustrates a second embodiment of a cache organization scheme for an N-way set-associative cache 600 with a DDR memory device that provides data in bursts of two cache lines, where N=xn. The FIG. 6 scheme can be implemented as either a two-way (n=2; x=1) or four-way (n=2; x=2) cache. For a cache block access in a two-burst device, four commands are issued. For example, retrieval of cache block A is accomplished as follows. A first send command issued to the DDR memory device 600 retrieves the tag rows 610, 612. A continue command retrieves the first and second data rows 614, 616 and a second continue command retrieves the third data row, including ECC field 618, along with data row 620. If cache block A is the block to be retrieved, then data row 620 is superfluous.

If, however, cache block B is the block of interest then a fourth continue command must be issued to retrieve data lines 622 and 624. In at least one embodiment, the fourth command is always issued regardless of whether the first or second of two contiguous cache blocks is desired. This is due to the relatively long latency between issuance of a send or continue command and the cache controller's 411 receipt of the requested data. Thus, although the fourth command may retrieve superfluous data if the first cache block is desired, in at least one embodiment, the fourth command is always issued in order to enhance efficiency. The cache controller 411 need not wait to receive the superfluous data before processing the desired data for a first cache block. Regardless of whether the fourth command is issued or not, roughly 50% of the time all the desired data (i.e., all data for cache block A) is received by the completion of the third command.

If the FIG. 6 scheme is implemented as a two-way set-associative cache, only one send command is issued for a snoop. For a device with a burst size of two, a snoop pulls in two tags 610, 612 with one send command. For a four-way set-associative cache, a second send command is issued to pull in the remaining two tags 626, 628 in the next two-line burst.

FIG. 6 illustrates a cache organization scheme that is interleaved differently than the FIG. 5 cache 500. In FIG. 6, n tag rows are stored in n contiguous storage locations 610, 612 for a first cache organization block 670*a*. In addition, n tag rows are stored in n contiguous storage locations 626, 628 for a second cache organization block 670*b*. In this manner, the FIG. 6 cache 600 can be implemented as a two-way (n=2, x=1) or four-way (n=2, x=2) cache for devices of burst length of two, wherein two contiguous storage locations are used to store the tag rows corresponding to each of n=2 cache blocks.

Contiguously following the n storage locations 610, 612 that store the tag rows (i.e., row "0") for each cache block, storage is allocated in m contiguous memory locations 614 through 624 in the cache 600 to store memory data. The memory data to be stored in the m memory locations 614–624 is from the n memory locations in the next level of the memory hierarchy with which the tag rows in the n storage locations 610, 612 are associated. A subset (q) of the m storage locations is allocated for storage of the remainder of each memory line from the next memory level, wherein the tag and a portion of the memory data for the memory line are stored in the corresponding tag row 610, 612.

For example, for a device with a burst length of two, n=2. In a cache that provides 144 bit storage locations, q=3 where the memory data for a memory line comprises 512 bits. Accordingly, in order to implement a 2-way set-associative cache, each stored memory line will require allocation of 3 of the m data rows, in addition to a tag row 610, 612, to store its data. Three (3) data rows (i.e., q) multiplied by the two (2) ways (i.e., n) equals 6 (i.e., m). Therefore, m=nq for a cache implemented in a memory device having a burst length of two.

FIG. 6 illustrates that each of the subsets of q storage locations is stored in a interleaved pattern in relation to each other within the m storage locations. However, the interleaved pattern is different from the interleaved pattern shown in FIG. 5. In FIG. 6, the three data rows 614–618 associated with the first tag row 610 are stored contiguously, followed by the three data rows 620–624 (stored contiguous to each other) associated with the second tag row 612.

The logic to handle a read or writeback for a cache line stored according to the interleaved scheme illustrated in FIG. 6 is more complex than that discussed above in connection with the interleaved scheme illustrated in FIG. 4. In determining which row is of interest from each burst, the cache controller 411 (FIG. 1) cannot assume, in the FIG. 6 interleaved scheme, that the same relative row in each burst is of interest. For instance, to read or write back cache block A, rows 610, 614, 616, and 618 are of interest. For a device with a burst length of two, the cache controller 411 (FIG. 1) must implement logic that recognizes and accommodates the following sequence. On a first send command, rows 610 and 612 are received. The first row is of interest and the second row is not. On a subsequent continue command, rows 614 and 616 are received. Both are of interest. On a subsequent continue command, rows 618 and 620 are received. The first row 618 is of interest, but the second 620 is not.

FIG. 7 illustrates a generalization of the FIG. 6 scheme to an N-way set-associative cache in a device with a burst length of n, where N=xn. For illustrative purposes, FIG. 7 will be discussed as an N-way interleaved cache where n=4. While only one cache organization block 770 is shown, one skilled in the art will recognize that a plurality of x cache organization blocks 770 may be utilized to implement a 4x-way cache. For a device with a burst length of four, the cache controller logic is more complex in the FIG. 7 scheme than in the FIG. 5 scheme. In determining which row is of interest from each burst, the cache controller 411 (FIG. 1) cannot assume, in the FIG. 7 interleaved scheme, that the same relative row in each burst is of interest. For instance, to read or write back cache block A, rows 710, 718, 720 and 722 are of interest. For a device with a burst length of four, the cache controller 411 (FIG. 1) must implement logic that recognizes and accommodates the following sequence. On a first send command, rows 710 through 716 are received. The first row is of interest and the remaining rows are not. On a subsequent continue command, rows 718 through 724 are received. The first three are of interest and the remaining one is not. As another example, to read or write back cache block N, rows 716, 736, 738 and 740 are of interest. For a device with a burst length of four, the cache controller 411 (FIG. 1) must implement logic that recognizes and accommodates the following sequence. On a first send command, rows 710 through 716 are received. The last row is of interest and the first three rows are not. On a subsequent continue command, rows 718 through 724 are received. None are of interest. On a subsequent continue command, rows 726, 728, 730, and 732 are received. None are of interest. On a subsequent continue command, rows 734, 736, 738 and 740 are received. The latter three rows are of interest, but the first is not.

In sum, described above are various interleaved cache schemes in a burst-type memory device. The scheme can be employed in a cache system that utilizes DDR memory devices or any other burst-type memory devices to provide cache storage. Such interleaved cache system implemented using devices with a burst length of "n" provides for an n-way set-associative cache without requiring additional bandwidth from the device for snoops. In the cache system described herein, the system includes a DDR memory device or other burst-type memory device and also includes a means for storing and organizing the data in the memory device as described above in connection with the discussions of FIGS. 4, 5, 6 and 7. In at least one embodiment, the memory device increments the base address for burst transmissions by n rather than 1. In at least one embodiment, the means for organizing the tag data and memory data as described above is a hardware circuit implemented in the cache controller hardware 411. In another embodiment, the means for organizing the tag and memory data is software code (also referred to herein as a computer program) that includes instructions for implementing the storage and organization schemes illustrated in FIGS. 4, 5, 6 and 7. Such software code is used, for instance, in an embodiment that implements at least a portion of the cache controller 411 in software. One skilled in the art will recognize that the software code can be written in any conventional programming language, including low-level assembly language and higher-level languages such as C++. One skilled in the art will also recognize that the means for storing and organizing cache data can also be implemented in firmware or as a combination of hardware, software, and/or firmware.

Alternative Embodiments

While particular embodiments of the present invention have been shown and described, it will be recognized to those skilled in the art that, based upon the teachings herein, further changes and modifications may be made without departing from this invention and its broader aspects and, thus, the appended claims are to encompass within their scope all such changes and modifications as are within the true spirit and scope of the invention.

For instance, the cache 300, 500, 600 need not necessarily be 144 bits wide. The width of the rows in the cache 300, 500, 600 may be altered as necessary to address design considerations, such as pin counts. For instance, the cache 300, 500, 600 could be 72 bits wide, or 288 bits wide, or any other width.

Also, for instance, in at least one alternative embodiment, the data store 300 provides for a parity field rather than the ECC fields 310, 330. In at least one other embodiment, the data store does not provide for any error checking or error correction fields.

Also, for instance, the cache storage schemes identified in FIGS. 5 and 6 illustrate that tag rows and memory data are stored in a contiguous relationship. It is not necessary that the information described therein be actually stored in contiguous memory locations, as long as they can be logically accessed as though they were stored contiguously.

Also, for instance, although DDR SRAM memory modules have been listed as an example of a DDR memory device, other memory devices may be used. Any burst-type memory device, including both SRAM and DRAM devices, regardless of manufacturer, may be used to implement the interleaved cache embodiments described herein.

We claim:

1. A method for storing information in a cache, comprising:

storing a first tag data in one of a plurality of n contiguous storage locations in a memory device, wherein the first tag data is associated with a first of n locations in a memory level device;

storing a second tag data in another one of the plurality of n contiguous storage locations in the memory device, wherein the second tag data is associated with a second one of the n locations in the memory level device;

storing the contents of the first memory level device location in a first subset of a plurality of m contiguous storage locations in the memory device, wherein the plurality of m contiguous storage locations follow the n contiguous storage locations in a contiguous relationship within the memory device, wherein the first subset comprises q of the m storage locations, where m/n=q;

wherein n is an inter multiple of 2, m is an integer≧n, and q is an integer≧1; and storing the contents of the second memory level device location in a second subset of the plurality of m contiguous storage locations in the memory device, wherein the other second subset comprises q of the m continuous storage locations, where m/n=q;

wherein n is an integer multiple of 2, m is an integer≧n, and q is an integer≧1;

wherein storing the contents of the first memory level device location in the first subset and storing the contents of the second memory level device location in the second subset further comprises storing the contents of the first location and the contents of the second location in an interleaved relationship with each other; and wherein storing the contents of the first location and the contents of the second location in an interleaved relationship with each other further comprises storing said contents such that portions of the contents of the first location and contents of the second location occupy alternating contiguous ones of the m locations.

2. The method recited in claim 1, further comprising:

when the first subset of the plurality of storage locations is denoted by a set S, wherein set S comprises locations $S_1, S_2 \ldots S_{q;}$; and when the second subset of the plurality of storage locations is denoted by the set T, wherein set T comprises locations $T_1, T_2, \ldots T_q$;

storing said contents such that portions of the content of the first location and content of the second location occupy alternating contiguous ones of the m locations further comprises storing said contents in the following alternating pattern in contiguous ones of the m memory locations: $S_1, T_1, S_2, T_2, \ldots S_q, T_q$.

3. The method recited in claim 1, wherein n=2.

4. The method recited in claim 3, wherein the memory device has a burst length of two.

5. The method recited in claim 4, wherein the memory device increments a base address by an integer multiple of 2 for each cache row, besides an initial row, transmitted during a burst transmission.

6. The method recited in claim 1, further comprising:

storing the contents of each of a plurality of additional tag rows in a corresponding one of the plurality of n contiguous storage locations in the memory device, wherein the contents of each of the plurality of additional tag rows is associated with a corresponding one of the remaining n locations in the memory level device; and storing the contents of each of the remaining n memory level device locations in a distinct corresponding one of remaining subsets of the plurality of m contiguous storage locations in the memory device, wherein each of the remaining subsets comprises q of the m storage locations, where m/n=q.

7. The method recited in claim 6, wherein:

when each of the distinct corresponding remaining subsets is denoted by a corresponding set (denoted as set X through set X'), wherein each set comprises storage locations 1 through q;

storing the contents of each of the remaining n memory level device locations further comprises storing said contents in the following alternating pattern in contiguous ones of the m memory locations: $S_1, T_1, X_1 \ldots X'_1, S_2, T_2, X_2 \ldots X'_2 \ldots S_q, T_q, X_q \ldots X'_q$.

8. The method recited in claim 6, wherein the memory device has a burst length of n.

9. The method recited in claim 8, wherein the memory device increments a base address by an integer multiple of n for each cache row, besides an initial row, transmitted during a burst transmission.

10. The method recited in claim 6, wherein n=4.

11. The method recited in claim 10, wherein the memory device has a burst length of four.

12. The method recited in claim 11, wherein the memory device increments a base address by an integer multiple of 4 for each cache row, besides an initial row, transmitted during a burst transmission.

13. The method recited in claim 1, wherein:

storing the first tag data further comprises storing first meta data; and storing the second tag data further comprises storing second meta data.

14. The method recited in claim 1, wherein:

storing the first tag data further comprises storing first error correction code data; and storing the second tag data further comprises storing second error correction code data.

15. A cache system, comprising:

a memory device;

logic that stores a first tag data in one of a plurality of n contiguous storage locations in the memory device, wherein the first tag data is associated with a first of n locations in a memory level device;

logic that stores a second tag data in another one of the plurality of n contiguous storage locations in the memory device, wherein the second tag data is associated with a second one of the n locations in the memory level device;

logic that stores the contents of the first memory level device location in a first subset of a plurality of m contiguous storage locations in the memory device, wherein the plurality of m contiguous storage locations follow the n contiguous storage locations in a contiguous relationship within the memory device, wherein the first subset comprises q of the m contiguous storage locations, where m/n=q;

wherein n is an integer multiple of 2, m is an integer≧n, and q is an integer≧1; and logic that stores the contents of the second memory level device location in a second subset of the plurality of m contiguous storage locations in the memory device, wherein the second subset comprises q of the m contiguous storage locations, where m/n=q;

wherein n is an integer multiple of 2, m is an integer≧n, and q is an integer≧1;

wherein storing the contents of the first memory level device location in the first subset and storing the contents of the second memory level device location in the second subset further comprises storing the contents of the first location and the content of the second location in an interleaved relationship with each other; and wherein storing the content of the first location and the content of the second location in an interleaved relationship with each other further comprises storing said contents such that portions of the content of the first location and content of the second location occupy alternating contiguous ones of the m locations.

16. The cache system recited in claim 15, further comprising:

when the first subset of the plurality of storage locations is denoted by a set S, wherein set S comprises locations $S_1, S_2 \ldots S_q$; and when the second subset of the plurality of storage locations is denoted by a set T, wherein set T comprises locations $T_1, T_2 \ldots T_q$;

logic that stores said contents such that portions of the content of the first location and content of the second location occupy alternating contiguous ones of the m locations further comprises logic that stores said contents in the following alternating pattern in contiguous ones of the m memory locations: $S_1, T_1, S_2, \ldots S_q, T_q$.

17. The cache system recited in claim 15, wherein n=2.

18. The cache system recited in claim 17, wherein the memory device has a burst length of two.

19. The cache system recited in claim 18, wherein the memory device increments a base address by an integer multiple of 2 for each cache row, besides an initial row, transmitted during a burst transmission.

20. The cache system recited in claim 15, further comprising:

logic that stores the contents of each of a plurality of additional tag rows in a corresponding one of the plurality of n contiguous storage locations in the memory device, wherein the contents of each of the plurality of additional tag rows is associated with a corresponding one of the remaining n locations in the memory level device; and logic that stores the contents of each of the remaining n memory level device locations in a distinct corresponding one of remaining subsets of the plurality of m contiguous storage locations in the memory device, wherein each of the remaining subsets comprises q of the m storage locations, where m/n=q.

21. The cache system recited in claim 20, wherein:

when each of the distinct corresponding remaining subsets is denoted by a corresponding set (denoted as set X through set X'), wherein each set comprises storage locations 1 through q;

storing the contents of each of the remaining n memory level device locations further comprises storing said contents in the following alternating pattern in contiguous ones of the m memory locations: $S_1, T_1, X_1 \ldots X'_1, S_2, T_2, X_2 \ldots S_q, T_q, X_q \ldots X'_q$.

22. The cache system recited in claim 20, wherein the memory device has a burst length of n.

23. The cache system recited in claim 22, wherein the memory device further comprises logic that increments a base address by an integer multiple of n for each cache row, besides an initial row, transmitted during a burst transmission.

24. The cache system recited in claim 20, wherein n=4.

25. The cache system recited in claim 24, wherein the memory device has a burst length of four.

26. The cache system recited in claim 25, wherein the memory device further comprises logic that increments a base address by an integer multiple of 4 for each cache row, besides an initial row, transmitted during a burst transmission.

27. The cache system recited in claim 15, wherein:

logic that stores the first tag data further comprises logic that stores first meta data; and logic that stores the second tag data further comprises logic that stores second meta data.

28. The cache system recited in claim 15, wherein:

logic that stores the first tag data further comprises logic that stores first error correction code data; and logic that stores the second tag data further comprises logic that stores second error correction code data.

29. A cache controller, comprising:

logic that stores a first tag data in one of a plurality of n contiguous storage locations in a memory device, wherein the first tag data is associated with a first of n locations in a memory level device;

logic that stores a second tag data in another one of the plurality of n contiguous storage locations in the memory device, wherein the second tag data is associated with a second one of the n locations in the memory level device;

logic that stores the contents of the first memory level device location in a first subset of a plurality of m contiguous storage locations in the memory device, wherein the plurality of m contiguous storage locations follow the n contiguous storage locations in a contiguous relationship within the memory device, wherein the first subset comprises q of the m contiguous storage locations, where m/n=q;

wherein n is an integer multiple of 2, m is an integer≧n, and q is an integer≧1; and logic that stores the contents of the second memory level device location in a second subset of the plurality of m contiguous storage locations in the memory device, wherein the second subset comprises q of the m contiguous storage locations, where m/n=q;

wherein n is an integer multiple of 2, m is an integer≧n, and q is an integer≧1;

wherein logic that stores the contents of the first memory level device location in the first subset and that stores the contents of the second memory level device location in the second subset further comprises logic that stores the content of the first location and content of the second location in an interleaved relationship with each other; and wherein logic that stores the content of the first location and the content of the second location in an interleaved relationship with each other further comprises logic that stores said contents such that portions of the content of the first location and content of the second location occupy alternating contiguous ones of the m locations.

30. The cache controller recited in claim 29, further comprising:

when the first subset of the plurality of storage locations is denoted by a set S, wherein set S comprises locations $S_1, S_2, \ldots S_q$; and when the second subset of the plurality of storage locations is denoted by a set T, wherein set T comprises locations $T_1, T_2 \ldots T_q$;

logic that stores said contents such that portions of the content of the first location and content of the second location occupy alternating contiguous ones of the m locations further comprises logic that stores said contents in the following alternating pattern in contiguous ones of the m memory locations: $S_1, T_1, S_2, T_2 \ldots S_q, T_q$.

31. The cache controller recited in claim 29, wherein n=2.

32. The cache controller recited in claim 31, wherein the memory device has a burst length of two.

33. The cache controller recited in claim 32, wherein the memory device increments a base address by an integer multiple of 2 for each cache row, besides an initial row, transmitted during a burst transmission.

34. The cache controller recited in claim 29, further comprising:

logic that stores the contents of each of a plurality of additional tag rows in a corresponding one of the plurality of n contiguous storage locations in the memory device, wherein the contents of each of the plurality of additional tag rows is associated with a corresponding one of the remaining n locations in the memory level device; and logic that stores the contents of each of the remaining n memory level device locations in a distinct corresponding one of remaining subsets of the plurality of m contiguous storage locations in the memory device, wherein each of the remaining subsets comprises q of the m storage locations, where m/n=q.

35. The cache controller recited in claim 34, wherein:

when each of the distinct corresponding remaining subsets is denoted by a corresponding set (denoted as set X through set X'), wherein each set comprises storage locations 1 through q;

storing the contents of each of the remaining n memory level device locations further comprises storing said contents in the following alternating pattern in contiguous ones of the m memory locations: $S_1, T_1, X_1 \ldots X'_1, S_2, T_2, X_2 \ldots X'_2 \ldots S_q, T_q, X_q \ldots X'_q$.

36. The cache controller recited in claim 34, wherein the memory device has a burst length of n.

37. The cache controller recited in claim 36, wherein the memory device further comprises logic that increments a base address by an integer multiple of n for each cache row, besides an initial row, transmitted during a burst transmission.

38. The cache controller recited in claim 34, wherein n=4.

39. The cache controller recited in claim 38, wherein the memory device has a burst length of four.

40. The cache controller recited in claim 39, wherein the memory device further comprises logic that increments a base address by an integer multiple of 4 for each cache row, besides an initial row, transmitted during a burst transmission.

41. The cache controller recited in claim 29, wherein:

logic that stores the first tag data further comprises storing first meta data; and logic that stores the second tag data further comprises logic that stores second meta data.

42. The cache controller recited in claim 29, wherein:

logic that stores the first tag data further comprises logic that stores first error correction code data; and logic that stores the second tag data further comprises logic that stores second error correction code data.

* * * * *